Dec. 8, 1953  R. G. HALL  2,661,662
AUTOMATIC MACHINE FOR MILLING THE
ENDS OF HANDLES OR THE LIKE
Filed March 10, 1948  4 Sheets-Sheet 1
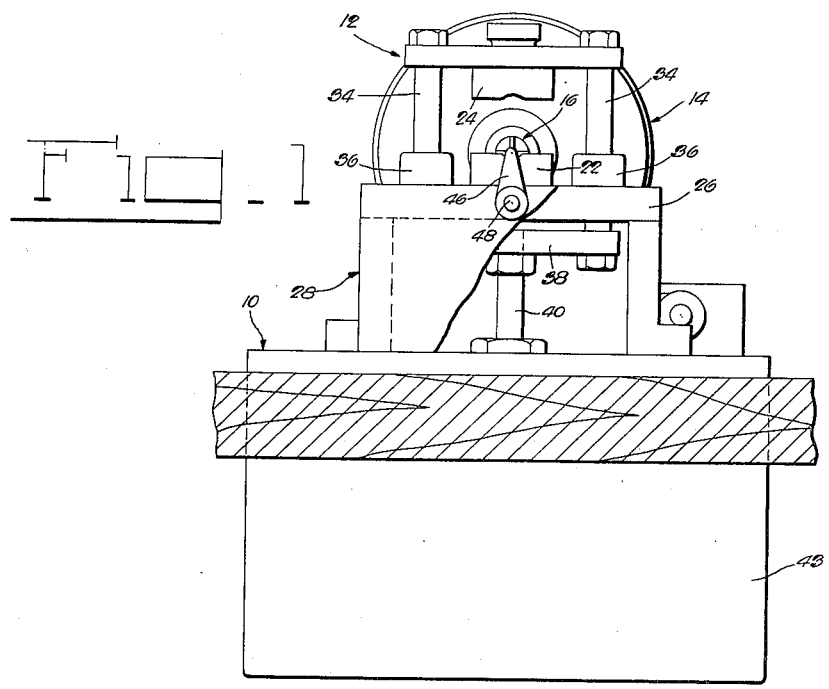
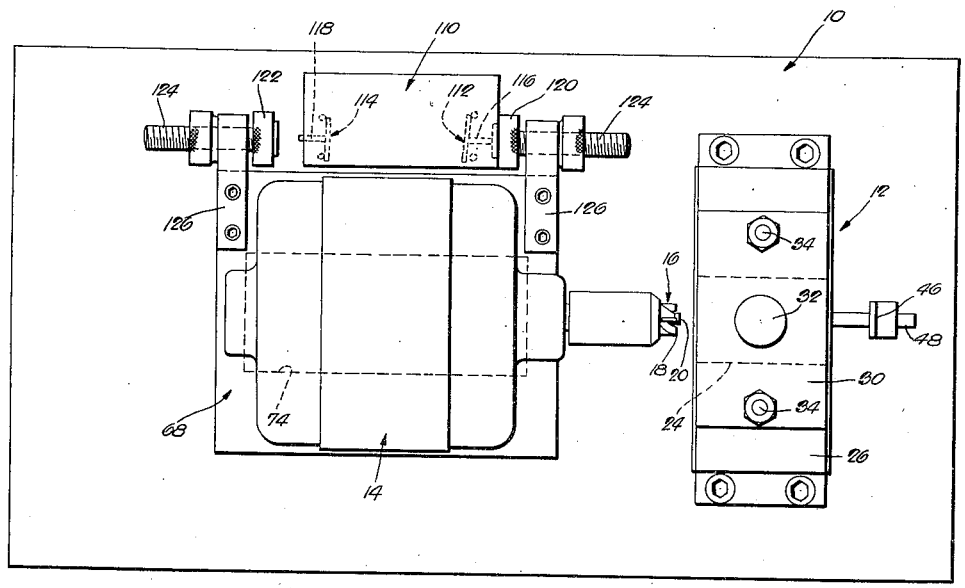
INVENTOR.
ROLLAND G. HALL
BY Edwin D. Lensohn
ATTORNEY.

Dec. 8, 1953    R. G. HALL    2,661,662
AUTOMATIC MACHINE FOR MILLING THE
ENDS OF HANDLES OR THE LIKE
Filed March 10, 1948    4 Sheets-Sheet 2

INVENTOR.
ROLLAND G. HALL
BY Edwin Lensola
ATTORNEY.

Dec. 8, 1953
R. G. HALL
2,661,662
AUTOMATIC MACHINE FOR MILLING THE
ENDS OF HANDLES OR THE LIKE
Filed March 10, 1948
4 Sheets-Sheet 3
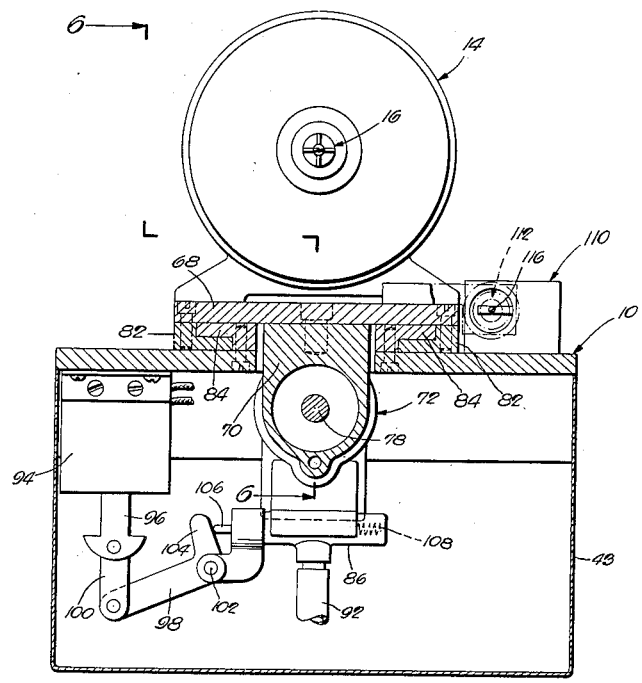
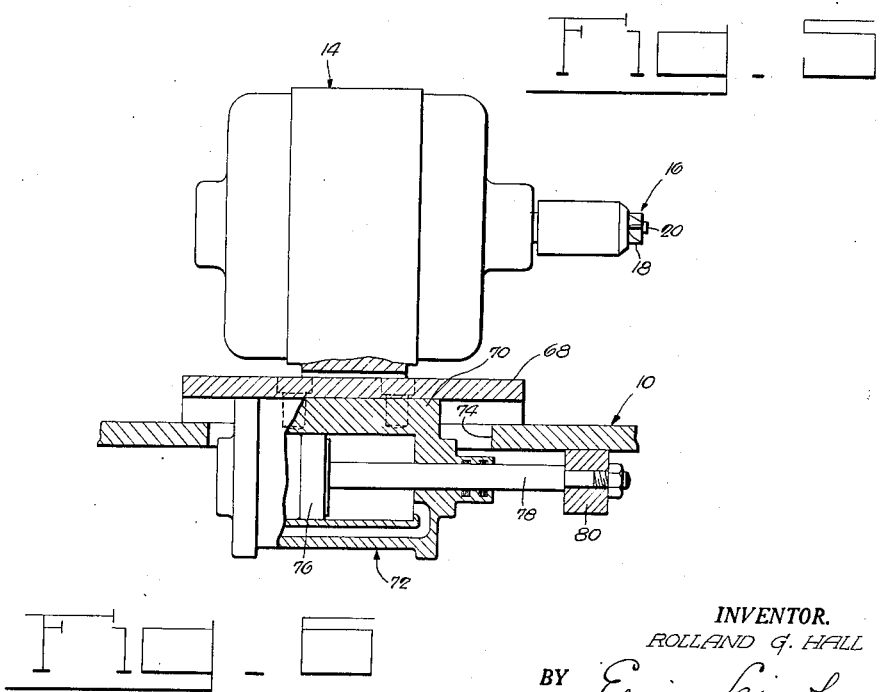
INVENTOR.
ROLLAND G. HALL
BY Edwin Leinsohn
ATTORNEY.

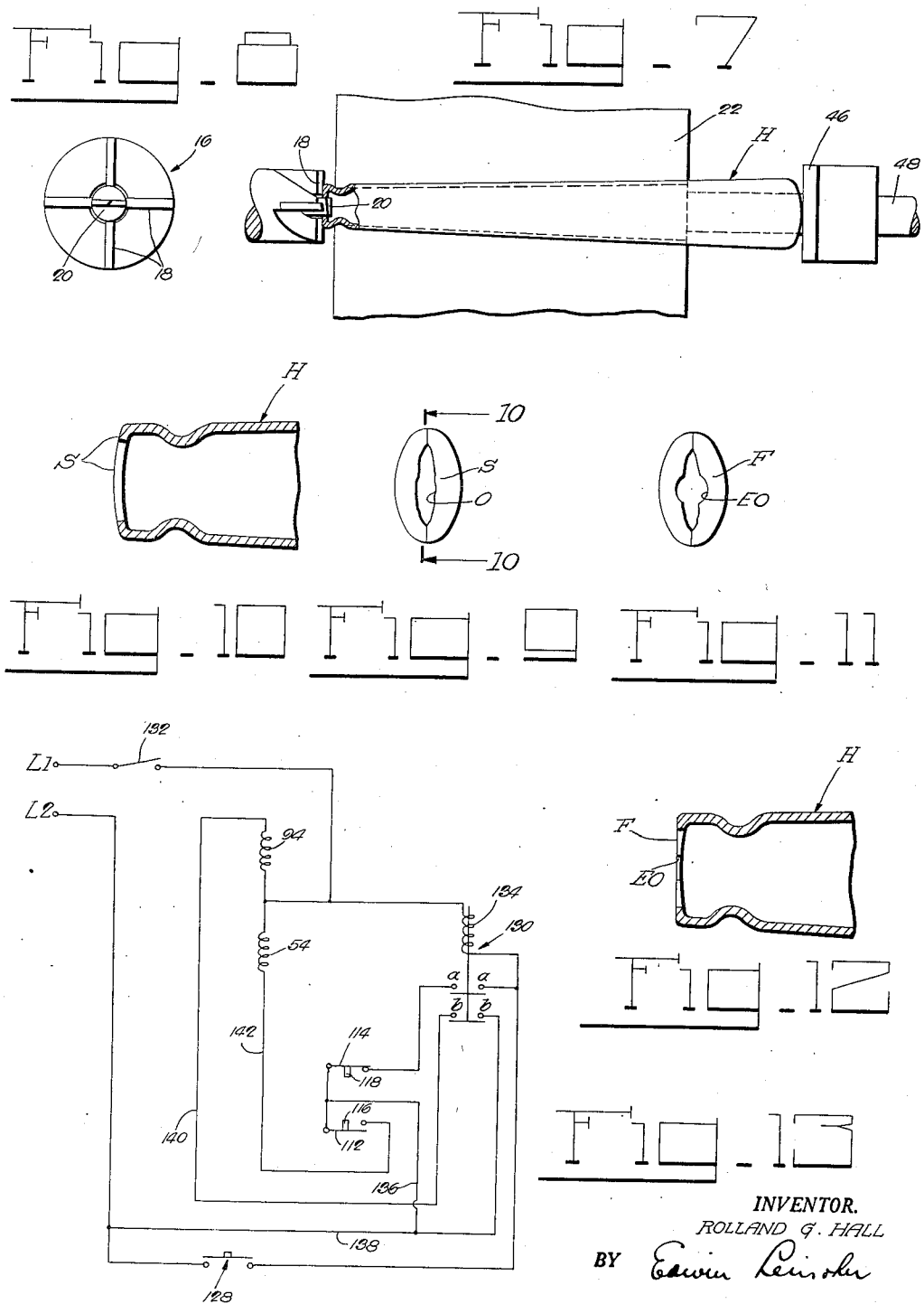

Patented Dec. 8, 1953

2,661,662

UNITED STATES PATENT OFFICE 2,661,662

AUTOMATIC MACHINE FOR MILLING THE ENDS OF HANDLES OR THE LIKE

Rolland G. Hall, Yalesville, Conn., assignor to R. Wallace & Sons Manufacturing Company, Wallingford, Conn., a corporation Application March 10, 1948, Serial No. 14,004

6 Claims. (Cl. 90—14)

The present invention relates to automatic machines for machining the ends of hollow handles and similar articles.

In the manufacture of table knives or other articles which are provided with hollow handles, it is necessary to face the ends of the handles through which the shanks of the knives are inserted, and it is desirable to ream the openings at said ends of the handles.

The primary object of the present invention is the provision of an automatically operable machine for performing the above indicated facing and reaming operations.

The above and other objects, features and advantages of the present invention and the construction and operation of the machine will be fully understood from the following description considered in connection with the accompanying illustrative drawings.

In the drawings:

Fig. 1 is a front view of the machine, a part being cut away for the purpose of illustration, and a part of the bench top for the machine being shown in section;

Fig. 2 is a top plan view of the machine;

Fig. 5 is a sectional view on the line 5—5 of Fig. 3;

Fig. 6 is a sectional view on the line 6—6 of Fig. 5;

Fig. 7 is a side view, partly in section, showing a handle clamp in position and engaged by the machining tool;

Fig. 8 is an end view of the machine tool;

Fig. 9 is an end view of a typical handle before it is faced and reamed;

Fig. 10 is a sectional view of the handle on the line 10—10 of Fig. 9;

Fig. 11 is an end view of the handle after it is faced and reamed;

Fig. 12 is a side view of the handle after it is faced and reamed; and

Fig. 13 is a diagram of the control circuit.

Figure 3:
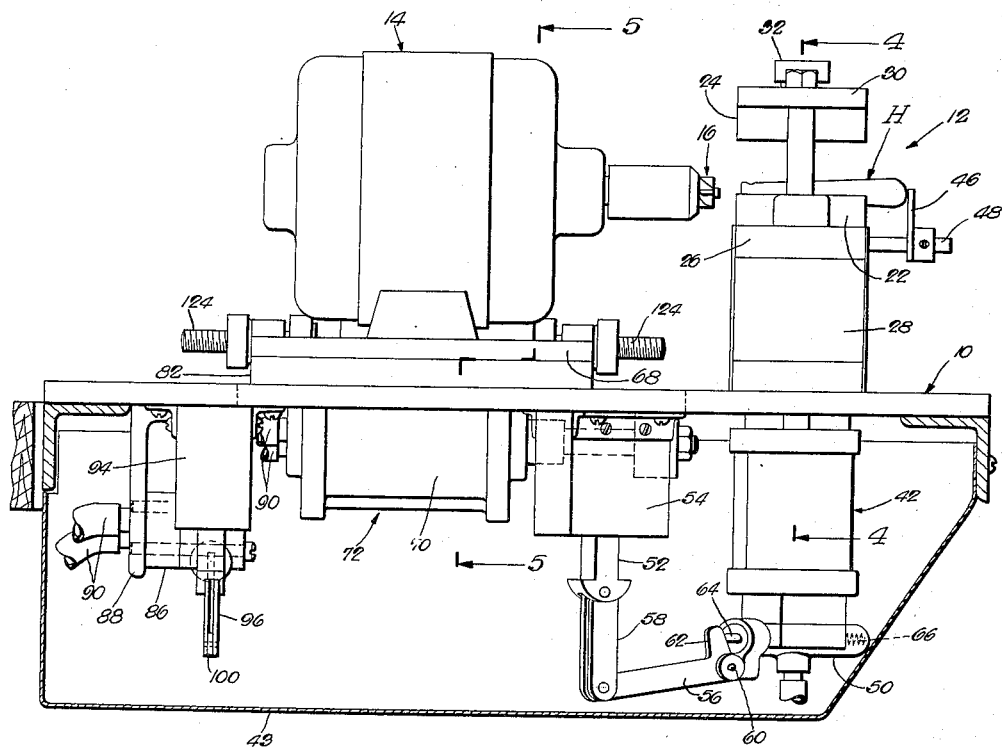
Fig. 3 is a side view thereof, the housing for certain parts of the machine being shown in section.
Figure 4:
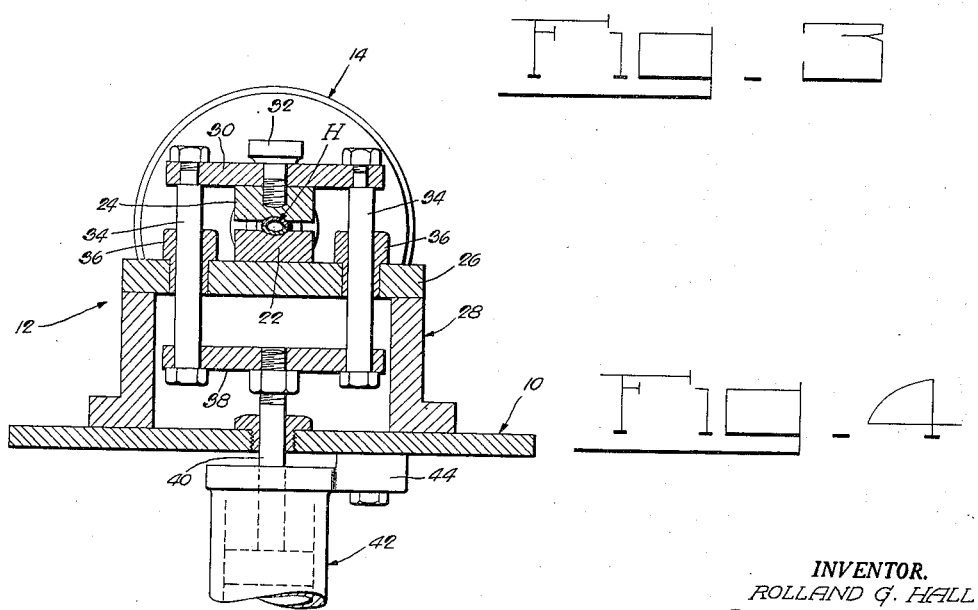
Fig. 4 is a sectional view on the line 4—4 of Fig. 3.

Referring now to the drawings in detail, the machine embodying the present invention comprises a horizontal support 10 on which there are mounted a clamping device 12 and an electric motor 14 which drives the rotary machining tool 16. The latter comprises a milling cutter 18 and a reaming cutter 20, in unitary relation, for facing and reaming the handle. As hereinafter described, the handle is clamped in stationary position in the clamping means 12, and the motor which rotates the tool 16 moves toward and away from the clamping means and thus toward and away from the end of the handle which is to be machined and thereby moves the machining tool into and out of engagement with said end of the handle for performing the facing and reaming operations thereon.

The clamping means 12 comprises the stationary clamping member 22 and a companion movable clamping member 24. The stationary clamping member is mounted on a supporting plate 26 of a frame 28. The movable clamping member 24 is secured to a plate 30 in any suitable way, as by a screw 32. Actuating and guide rods 34 are fastened to plate 30 and are vertically movable in guide bearings 36 mounted in frame plate 26. Rods 34 are fastened to an actuating plate 38 fixed to and movable with the piston rod 40 of a double-acting fluid pressure or compressed air motor 42 in housing 43. The cylinder of said motor is supported by plate 10 and more particularly by the bracket 44 which is provided on said motor and fastened to said plate. A positioning member 46 for the handle H, or other work which is to be machined, is adjustably secured to a stud 48 fixed to frame plate 26.

The clamp actuating motor 42 is operable under the control of a solenoid actuated valve 50 (Fig. 3). More particularly, the plunger 52 of the solenoid 54 is connected to the valve-actuating lever 56 by a link 58. Lever 56 is pivotally mounted on the housing of the valve 50 as indicated at 60, and has an arm 62 bearing on the valve stem 64. A spring 66 is provided in the valve housing for resiliently opposing movement of the valve in one direction, when the solenoid is energized, and for moving the valve in its opposite direction when the solenoid 54 is deenergized. The valve action of motor 42 is such that when solenoid 54 is energized the motor piston moves downwardly in the cylinder for moving the movable clamping member 24 downwardly to clamp the handle H in position, and after the end of the handle is machined and the machining tool is disengaged from the handle, solenoid 54 is deenergized and the valve is moved by spring 66 to a position in which the compressed air is exhausted from above the motor piston and is admitted into the cylinder below the motor piston for raising the latter and thereby moving the movable clamping member 24 to its retracted position shown in Figs. 1 and 3.

As hereinbefore stated, the electric motor 14 which operates the machining tool 16 is movable forwardly toward and rearwardly away from the clamping device 12. For this purpose, motor 14 is fixed to a slidable plate 68 which is fastened to the axially movable cylinder 70 of a double-acting fluid pressure or compressed air motor 72 (Figs. 5 and 6). As shown in Fig. 6, the main supporting plate 10 is provided with an opening 74 for the connection of cylinder 70 to motor 14 and for accommodating the axial movement of said cylinder in the operation of motor 72 for moving the electric motor 14 toward and away from clamping device 12. Also, as shown in Fig. 6, the piston 76 of motor 72 is held stationary by the securement of the piston rod 78 to the bracket 80 fixed to plate 10. Guide members 82 are fixed to the motor-carrying plate 68 and are in sliding engagement with the complementary stationary guide members 84 which are fixed to main supporting plate 10 as shown in Fig. 5. The compressed air motor 72 is operable under the control of a solenoid actuated valve 86 which is mounted in stationary position, separately from the motor, on a bracket 88 and is connected to the cylinder 70 by flexible tubing 90. The valve exhaust is indicated at 92 in Fig. 5. The valve action is substantially the same as that of clamp operating motor 42. As here shown, the solenoid 94 has its plunger 96 connected to the valve operating lever 98 by a link 100. Valve operating lever 98 is pivotally mounted on the housing of the valve 86 as indicated at 102 and is provided with an arm 104 engageable with the valve stem 106 for moving the latter against the force of the spring 108 when solenoid 94 is energized. It will be understood that when solenoid 94 is energized valve 86 admits compressed air at one side of piston 76 for moving the cylinder in one direction, the air at the opposite side of the piston being exhausted, and when the solenoid is deenergized the valve is moved in the opposite direction by spring 108 whereby compressed air is admitted into the cylinder at said last mentioned side of the piston and is exhausted from the cylinder at the first mentioned side of the piston, whereby cylinder 70 moves in its opposite direction.

The above described operations of clamp actuating motor 42 and of motor 72 for advancing and retracting tool operated motor 14 are performed automatically under the control of a switch by suitable electric control devices in such manner that it is merely necessary for the operator of the machine to insert and remove the handles and momentarily operate a manually operable switch which may be either a push button switch or a pedal operated switch, preferably the latter. Referring to Fig. 2, a switch box 110 is mounted on supporting plate 10 and includes a normally open switch 112 and a normally closed switch 114 said switches being provided with operating members 116 and 118, respectively. Said switch operating members are arranged to be releasably engaged by the companion switch actuating members 120 and 122, respectively, carried by the companion adjustable rods 124 each of which is mounted in a companion bracket 126 which is secured to and movable by the slide plate 68 on which motor 14 is carried for movement toward and away from the clamping device 12, as described above. The arrangement is such that normally open switch 112 closes as soon as slide plate 68 starts to move toward the clamping device and remains closed until said slide plate returns to its starting or retracted position. The normally closed switch 114 remains closed until the motor reaches its predetermined projected position and then opens. When switch 114 opens, solenoid 94 is deenergized and the tool operating motor 14 is moved to its retracted or starting position, but as will presently be described, the clamp solenoid 54 which is energized as soon as switch 112 is closed remains energized until the motor returns to its retracted position and until the manually operated control switch 128 (Fig. 13) is closed by the operator for the next operation of the apparatus.

Referring now to the circuit diagram shown in Fig. 13, it will be noted that the control circuit includes an electro-magnetic relay which is operable under the control of the manually operated control switch 128. The closing of the control switch 128 by the operator of the machine completes a circuit through the coil 134 of relay 130, thereby closing both sets of contacts a—a and b—b of said relay. When contacts a—a are closed, a holding circuit is provided for said relay from line L1, the normally closed switch 114, the branch wire 136, and wire 138 which is connected to line L2. At the same time a circuit is completed through solenoid 94 from line L2 through said solenoid, to wire 140, and then through closed contacts b—b to wire 138 which is connected to line L2. As soon as solenoid 94 is energized the slide plate 68 starts to move toward its projected position for engaging the tool 16 with the handle H in the clamping device 12, as described above, and as soon as said slide plate 68 starts to move switch 112 closes, as hereinbefore stated, as a result, a circuit is completed through the clamping solenoid 54, from line L1 through said solenoid 54, wire 142, switch 112, wire 136, and wire 138 to line L2. It will be noted that when the motor 14 reaches its predetermined projected position, as determined by the adjustment of switch actuating member 124 of switch 114, said switch 114 is opened and interrupts the circuit through the coil 134 of relay 130 and through the solenoid 94, said relay opening the circuit at contacts a—a and b—b, without however opening the circuit through the clamping solenoid 54. Thus the clamping solenoid remains energized until the machining tool 16 disengages the end of the handle, the purpose of this being to prevent movement of the handle by the machine tool which would otherwise occur if the clamp were released before the handle is disengaged by the machining tool. As soon as the solenoid 94 is deenergized the control valve 86 of motor 72 is reversed and said motor is operated for moving the tool operating motor 14 to its retracted position. As soon as motor 14 reaches its retracted position, switch 112 is opened by the companion actuating member 120, thus interrupting the circuit through the clamping solenoid 54. When the clamping solenoid 54 is deenergized, the valve 50 is operated by spring 66 to admit air into the cylinder of motor 42 for moving the clamping member 24 to its retracted position so that the handle may be removed. As soon as the operator has inserted another handle in the clamping device, the cycle of operations initiated by momentarily closing switch 128 is repeated.

Figs. 9 to 12 illustrate more or less schematically the action of tool 16 on the end of the handle. As shown in Figs. 9 and 10 before the end of the handle is operated on it may have an irregularly shaped end surface S and a comparatively narrow opening O, as indicated by Figs. 9 and 10. However, as shown in Figs. 11 and 12, as a result of the operation of the tool 16 on said end of the handle, the latter is provided with a flat face F due to the action of the milling cutters 18 and with an enlarged opening EO as a result of the action of the reaming cutter 20.

It will be understood that while the present machine is intended primarily for facing the ends of the hollow metal handles of table knives or similar articles, said machine may be used for other purposes. Also, it will be understood that while I have shown and described the preferred embodiment of my invention, various changes in the details of construction and in the arrangement of parts may be made without departing from the underlying idea or principles of this invention within the scope of the appended claims.

Having thus described my invention, what I claim and desire to secure by Letters Patent is:

1. A machine of the character described, comprising clamping means for the work, a rotary tool, a motor having a driven shaft on which said tool is carried, said motor being reciprocable between retracted and advanced positions in which said tool is out of and in operative engagement, respectively, with the clamped work, a first fluid-pressure operated device for reciprocating said motor, a first shiftable valve normally in a position in which to admit fluid under pressure to said first device for moving said motor into said retracted position, a first relay acting, when energized, to shift said first valve into another position in which to admit fluid under pressure to said first device for moving said motor into said advanced position, a second fluid-pressure operated device for causing said clamping means to clamp and release the work, a second shiftable valve normally in a position in which to admit fluid under pressure to said second device to cause said clamping means to release the work, a second relay acting, when energized, to shift said second valve into another position in which to admit fluid under pressure to said second device to cause said clamping means to clamp the work, a first electric circuit for said first relay, said circuit including a normally open switch, a second electric circuit for said second relay, said second circuit including a normally closed switch which is opened by said motor in said retracted position thereof, a third relay acting, when energized, to close said switch of said first circuit, a starting circuit for said third relay, said starting circuit including a normally open push-button switch, and a holding circuit for said third relay, said holding circuit including a normally open switch closed by said third relay, when energized, and another normally closed switch opened by said motor in said advanced position thereof.

2. A machine of the character described comprising a rotary machining tool, means for releasably clamping the work in position for engagement by said tool, an electric motor for rotating said tool and on which said tool is mounted, means mounting said motor for movement toward and away from said clamping means to engage said tool with and disengage the same from the work, power operated means for moving said motor toward and away from said clamping means, manually operable control means for causing operation of said power-operated means to move said motor toward said clamping means, and automatic control means operated in timed relation with the movement of said motor toward said clamping means for causing operation of said power operated means to move said motor away from said clamping means, other power operated means for actuating said clamping means, and other control means responsive to the movement of said motor for causing said other power-operated means to clamp and release the work during movement of said motor toward and away from said clamping means, respectively, whereby said work is releasably clamped after movement of said motor towards said clamping means, said other control means comprising structure in fixed relation relative to said motor mounting means and switching means operatively associated with said structure, said switching means including a normally opened switch and a normally closed switch, the former switch being adapted to close on the predetermined movement of said motor in one direction and the latter switch being adapted to open to limit the movement of said motor in said one direction.

3. A machine of the character described comprising a rotary machining tool, means for releasably clamping the work in position for engagement by said tool, an electric motor for rotating said tool and on which said tool is mounted, means mounting said motor for movement toward and away from said clamping means to engage said tool with and disengage the same from the work, power operated means for moving said motor toward and away from said clamping means, manually operable control means for causing operation of said power-operated means to move said motor toward said clamping means, and automatic control means operated in timed relation with the movement of said motor toward said clamping means for causing operation of said power operated means to move said motor away from said clamping means, other power operated means for actuating said clamping means, and other control means responsive to the movement of said motor for causing said other power-operated means to clamp and release the work during movement of said motor toward and away from said clamping means, respectively, whereby said work is releasably clamped after movement of said motor towards said clamping means, said other control means comprising structure in fixed relation relative to said motor mounting means and switching means operatively associated with said structure, said switching means including a normally opened switch and a normally closed switch, the latter switch being normally spaced from said structure and disposed in the path of movement of the latter, said normally opened switch being adapted to close on the predetermined movement of said motor towards said clamping means by the cooperative disassociation of said structure and said normally opened switch and said normally closed switch being adapted to open when said motor reaches its advanced position by the cooperative association of said structure and said normally closed switch.

4. A machine of the character described comprising a rotary machining tool, means for releasably clamping the work in position for engagement by said tool, an electric motor for rotating said tool and on which said tool is mounted, means mounting said motor for movement toward and away from said clamping means to engage said tool with and disengage the same from the work, power operated means for moving said motor toward and away from said clamping means, manually operable control means for causing operation of said power-operated means to move said motor toward said clamping means, and automatic control means operated in timed relation with the movement of said motor toward said clamping means for causing operation of said power operated means to move said motor away from said clamping means, other power operated means for actuating said clamping means, and other control means responsive to the movement of said motor for causing said other power-operated means to clamp and release the work during movement of said motor toward and away from said clamping means, respectively, whereby said work is releasably clamped after movement of said motor towards said clamping means, said other control means comprising structure in fixed relation relative to said motor mounting means and switching means operatively associated with said structure, said switching means including a normally opened switch and a normally closed switch, the latter switch being normally spaced from said structure and disposed in the path of movement of the latter, said normally opened switch being adapted to close on the predetermined movement of said motor towards said clamping means by the cooperative disassociation of said structure and said normally opened switch and said normally closed switch being adapted to open when said motor reaches its advanced position by the cooperative association of said structure and said normally closed switch, and means for maintaining said clamping means in a work clamped position until said rotary tool reaches its retracted position.

5. A machine of the character described comprising a rotary machining tool, means for releasably clamping the work in position for engagement by said tool, an electric motor for rotating said tool and on which said tool is mounted, means mounting said motor for movement toward and away from said clamping means to engage said tool with and disengage the same from the work, power operated means for moving said motor toward and away from said clamping means, manually operable control means for causing operation of said power-operated means to move said motor toward said clamping means, and automatic control means operated in timed relation with the movement of said motor toward said clamping means for causing operation of said power operated means to move said motor away from said clamping means, other power operated means, for actuating said clamping means, and other control means responsive to the movement of said motor for causing said other power-operated means to clamp and release the work during movement of said motor toward and away from said clamping means, respectively, whereby said work is releasably clamped after movement of said motor towards said clamping means, said other control means comprising structure in fixed relation relative to said motor mounting means and switching means operatively associated with said structure, said switching means including a normally opened switch and a normally closed switch, the latter switch being normally spaced from said structure and disposed in the path of movement of the latter, said normally opened switch being adapted to close on the predetermined movement of said motor towards said clamping means by the cooperative disassociation of said structure and said normally opened switch and said normally closed switch being adapted to open when said motor reaches its advanced position by the cooperative association of said structure and said normally closed switch, and means for maintaining said clamping means in a work clamped position until said rotary tool reaches its retracted position, said last mentioned means comprising a clamping solenoid, the latter being de-energized when said motor mounting means is moved to its retracted position in response to the cooperative association of said normally opened switch and said structure.

6. A machine of the character described, comprising a rotary machining tool, means for releasably clamping the work in position for engagement by said tool, an electric motor for rotating said tool and on which said tool is mounted at one end, means mounting said motor for longitudinal movement toward and away from said clamping means to engage said tool with and disengage the same from the work, electrically controlled power operated means for moving said motor from a starting position forwardly toward said clamping means and rearwardly away from said clamping means to said starting position, a manually operable switch for initiating the operation of said electrically controlled power operated means for moving said motor forwardly, switching means operable in response to the position of said motor after a predetermined forward movement thereof for causing operation of said power operated means to move said motor rearwardly to said starting position, and a relay controlled holding circuit operable initially under the control of said manually operable switch and thereafter independently of the latter for maintaining said first mentioned operation of said power operated means independently of said manually operable switch and until said operation of the last mentioned switching means, and control means for releasably clamping the work after the movement of said motor forwardly, said control means comprising a normaly opened switch and companion switch actuating means in fixed relation relative to said motor mounting means, said last mentioned switch and said switch actuating means being normally operatively associated with each other with said last mentioned switch disposed in the path of movement of said switch actuating means, said last mentioned switch being adapted to be closed in response to the predetermined forward movement of said motor by the operative disassociation of said last mentioned switch and companion actuating means.

ROLLAND G. HALL.

References Cited in the file of this patent

UNITED STATES PATENTS

| Number | Name | Date |
|---|---|---|
| 351,692 | Dalzell | Oct. 26, 1886 |
| 398,378 | Codling | Feb. 26, 1889 |
| 2,042,379 | Barnes et al. | May 26, 1936 |
| 2,160,476 | Kampmeier | May 30, 1939 |
| 2,212,402 | Reiser | Aug. 20, 1940 |
| 2,301,028 | Esch | Nov. 3, 1942 |
| 2,327,920 | Moohl | Aug. 24, 1943 |